Oct. 15, 1968　　　G. H. SMIT ET AL　　　3,405,734
SELF-DRAINING VALVE

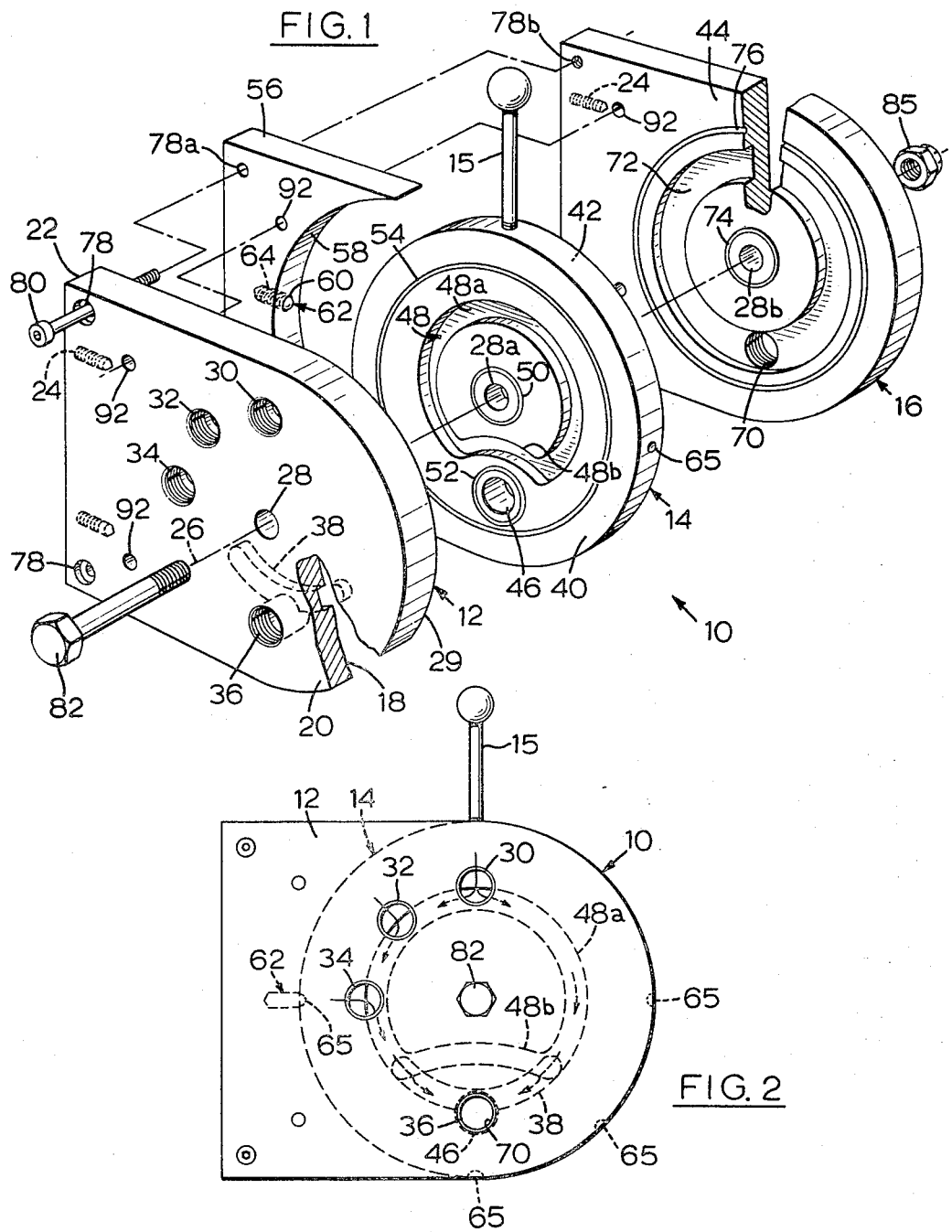

Filed Dec. 1, 1966　　　　　　　　　　　　2 Sheets-Sheet 2

INVENTORS
GERRIT H. SMIT
JOHN R. SKINNER
BY *Featherstonhaugh & Co.*
ATTORNEYS

# United States Patent Office 3,405,734
Patented Oct. 15, 1968

3,405,734
SELF-DRAINING VALVE
Gerrit Hendrik Smit and John R. Skinner, London, Ontario, Canada, assignors to London Concrete Machinery Company, a division of Hodgson Machine & Equipment Limited, London, Ontario, Canada, a corporation of Canada
Filed Dec. 1, 1966, Ser. No. 598,397
6 Claims. (Cl. 137—625.46)

ABSTRACT OF THE DISCLOSURE

This invention relates to valves. In particular the invention relates to a valve which has a plurality of output passages which are adapted to drain through the valve when they are not in use. Preferably the valve body consists of three plates arranged in a face-to-face relationship. One of the plates has an input opening which is connected to a source of supply of liquid. The input opening opens into an annular channel formed on the inner face of the first plate. The second plate is mounted for rotation about a central axis and has a through passage formed therein adapted to communicate with the annular channel formed in the first plate. The second plate has a drainage channel formed in the face which is disposed towards the third plate. The third plate has a plurality of output passages one of which is a drainage passage. All of the output passages formed in the third plate are adapted to communicate with either the through passage which is formed in the second plate or the drainage channel which is formed in the second plate depending upon the rotational position of the second plate. The structure of the valve is such that all of the output passages formed in the third plate are in communiction with the drainage passage formed in the third plate by way of the drainage channel except for the output passage which is in communication with the through passage formed in the second plate. This structure ensures that all of the output lines are drained back into the valve when they are not in use.

This invention relates to a self-draining valve.

In praticular the invention relates to a valve which has a plurality of discharge openings all of which are self-draining.

There are many applications in which it is desirable to drain a liquid circuit when the circuit is not in use. This is particularly true in outdoor applications where there is a danger of water freezing in a circuit if it is not drained off when the circuit is not in use. Considerable difficulty has been experienced in ensuring the proper drainage of the various water circuits which are employed in the transit mixers commonly used for transporting concrete. In these mixers it is desirable to have water flowing through any one of several fluid lines depending upon the operation which is being performed by the mixer. Heretofore the direction of water to any of the various lines has been achieved by the opening and closing of various independent valves. Small stop cocks have been provided at each of the valves in order to drain the circuits which are fed by these valves. The stop cocks are provided with relatively small discharge openings and consequently when the water is being drained from the stop cock in cold weather, freezing frequently occurs before the circuit is completely drained. Furthermore due to the small size of these stop cock valves and the rather rugged treatment which they are subjected to, the valves are frequently found to be inoperative. It wil be apparent that unless water is completely drained from the various water lines employed in a transit mixer the freezing of the water which occurs in cold weather will seriously damage the various water lines. Antifreeze solutions may and frequently are added to the water which circulates through a transit mixer but with the frequent recharging of the water supply, it is not always possible to ensure that the quantity of antifreeze in the circuit is adequate to prevent freezing of the various lines. The present invention overcomes the problems and difficulties outlined above by providing a self-draining valve which is adapted to direct fluid from a single input to any one of a plurality of output passages. The valve of the present invention is adapted by its arrangement of input, output and drainage passages to drain all of the fluid lines connected to the various output passages other than the output line which is operably located relative to the input passage. Consequently when the valve is adjusted to feed fluid through one output passage, the drainage passages formed in the valve are so arranged to permit drainage of liquid from all of the other output passages.

It is an object of the present invention to provide a self-draining valve which is simple to construct and inexpensive to maintain.

It is a further object of this invention to provide a self-draining valve wherein all of the output passages of the valve other than the output passage which is operatively aligned with the input passage are automatically drained.

It is a further object of this invention to provide a self-draining valve wherein the action of moving the input opening relative to the output openings from one station to another automatically provides drainage for all output passages other than the output passage through which the input is being discharged.

With these and other objects in view the present invention relates generally to a self-draining valve which includes an output member and an input member slidably mounted relative thereto. At least one through passage is formed in the input member and at least two through passages are formed in the output member. The input and the output members are slidable relative to one another to selectively align the input passage with either of the output passages. The input member is formed with drain passage means which is adapted to communicate between all of the output passages formed in the output member, other than the output passage with which the input passage is operatively aligned, and suitable drainage passage means formed in the output member.

The invention will be more clearly understood after reference to the following detailed specification read in conjunction with the drawings, wherein:

FIGURE 1 is an exploded pictorial view of a valve according to an embodiment of the present invention.

FIGURE 2 is a side view of the assembled valve showing one location of the input plate.

Figure 3:
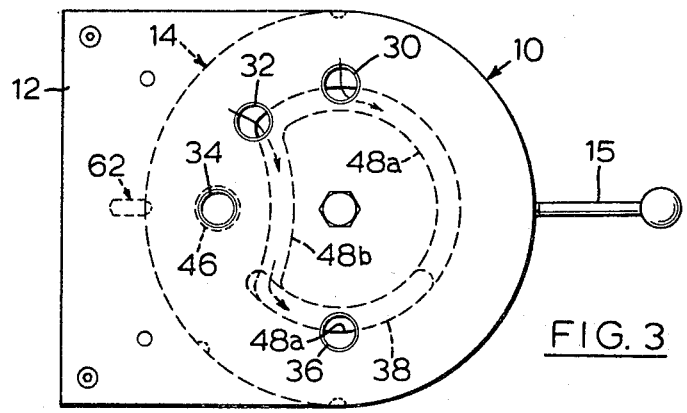
FIGURE 3 is a view similar to FIGURE 2 showing the input plate in another position.

With reference to FIGURE 1 of the drawings, it will be seen that the valve 10 according to the illustrated embodiment of the invention comprises three plates which are arranged in a laminated face-to-face relationship. The reference numeral 12 refers generally to the output plate member, the reference numeral 14 refers generally to the input plate member and the reference numeral 16 refers generally to the input flow directing plate.

Referring now to FIGURE 1 of the drawings, it will be seen that the output plate member 12 is formed with a planar inner surface 18 and an outer surface 20. The plate 12 is provided with a flat base 22 which is formed with at least two anchor holes 24 which are preferably internally threaded to enable the plate 12 to be rigidly secured in any required installation. An opening 28 is formed on the axis of rotation 26 of the output plate 12 as will be described hereinafter. A plurality of discharge openings 30, 32, 34 and 36 are spaced radially outwardly from the axis 26 of the opening 28 at equal distances from the axis 26. The edge 29 of the plate is in the form of a semicircle having a centre of rotation coincident with the axis of the opening 28. The passageways 30, 32, 34 and 36 are each adapted to threadably receive a conduit or coupling by way of which each port may be connected to a preselected fluid circuit. A drainage channel 38 is formed in the planar surface 18 in the area of the discharge opening 36. The channel 38 is in the form of an arc having a centre of rotation coincident with the axis of the opening 28. The arc shaped channel 38 extends an equal distance on either side of the vertical centre line of the discharge passage 36 and opens into the discharge passage 36 as shown in FIGURE 1.

The input plate member 14 is substantially circular and is formed with planar surfaces 40 and 42 which are located in a face-to-face relationship with the surfaces 18 and 44 of the plates 12 and 16 respectively. When mounted in an operative position the plate 14 is adapted to rotate about the centre line of the opening 28a. A handle 15 is rigidly secured to the plate 14 such that the plate 14 may be manually rotated to any required position. A single through passageway 46 is formed in the plate 14 and extends from the planar surface 40 to the planar surface 42. A drainage channel 48 is formed in the planar surface 40. The major portion 48a of the channel 48 has a circular path about the centre line of the opening 28a and the minor portion 48b has a curved path generated about the centre of aperture 46. The major portion 48a and the minor portion 48b of the channel 48 intersect one another and terminate at their intersections to form a continuous channel 48. The distance from the centre line of the opening 28a to the outer peripheral wall of the major portion 48a of the channel 48 is substantially equal to the radial distance between the centre line of the opening 28 and the centre line of the discharge openings 30, 32, 34 and 36 formed in the discharge plate 18. Similarly the radial distance between the centre line of the opening 28a and the centre line of the input opening 46 is substantially equal to the radial distance between the centre line of the opening 28a and the centre lines of the discharge openings 30, 32, 34 and 36.

O-ring grooves 50, 52 and 54 are formed in the planar surface 40 of the input plate 14. The groove 50 surrounds the central opening 28a, the groove 52 surrounds the input passage 46 and the groove 54 extends around the plate adjacent to the peripheral edge thereof.

The base plate 56 is preferably slightly thicker than the input plate 14 in order that the input plate may fit between the plates 12 and 16 in a close fitting sliding relationship wherein the O-rings of the assembly are sufficiently compressed to prevent leakage. The plate 56 has an upper surface 58 which has a curvature corresponding substantially to the curvature of the outer edge of the input plate 14. When the valve is assembled sufficient clearance is provided between the surface 58 and the outer edge of the plate 14 to provide free movement of the plate 14. An opening 60 is formed in the base plate 56 and a spring loaded ball assembly 62 is located in the opening 60. The spring 64 urges the ball upwardly into contact with the peripheral edge of the plate 14. A plurality of dimples 65 are located about the peripheral edge at predetermined locations relative to the input opening 46. The dimples 65 are located such that the ball 62 will enter a dimple when the input opening is aligned with any of the discharge openings 30, 32, 34 or 36 of the discharge plate 12.

The input flow directing plate 16 has the same general outline as the output plate member 12 and is similarly provided with anchor holes 24 and a central opening 28b. An input directing passage 70 extends through the plate and communicates with an open annular channel 72 which is formed in the planar surface 44. The annular channel 72 is concentric about the central opening 28b and has a width substantially equal to the diameter of the input opening 46 formed in the input plate 14. The radial distance from the centre line of the channel 72 to the centre line of the opening 28b is substantially equal to the radial distance from the centre line of the input opening 46 to the centre line of the central opening 28a of the input plate 14. O-ring grooves 74 and 76 are concentrically located with respect to the channel 72 and lie respectively radially inwardly from and radially outwardly from the channel 72.

For assembly purposes the output plate 12 is formed with a pair of recessed holes 78 and the base 56 is similarly prepared with clearance holes 78a and the input flow direction plate 16 is provided with threaded holes 78b. To assemble the valve the output plate 12, the base plate 56 and the input flow directing plate 16 are loosely mounted in an assembled condition by means of cap screws 80 which extend through the countersunk holes 78, clearance holes 78a and threadably engage the threaded holes 78b. The spring and ball assembly 62 are then placed in the opening 60 of the base 56. Suitable O-rings are then located in each of the O-ring grooves and the input plate member 14 is then located within the space formed between the output plate 12 and the input flow directing plate 16. A bolt 82 is then passed through the central openings 28b, 28a and 28 formed in the input flow directing plate 16, input plate member 14 and output plate member 12 respectively and a suitable lock nut is applied to the free end of the bolt to clamp the assembly together. When the bolt 82 has been located in an operative position the compression nut 85 is wound onto the bolt 82 sufficient to apply a sufficient compressive force to the O-rings to properly seal the assembly to prevent the escape of fluid therefrom while permitting the input plate member to rotate about the bolt 82. The cap screws 80 are then tightened and suitable packing or shimming is provided to increase the thickness of plate 56 to prevent distortion due to the tightening of cap screws 80. When the valve has been properly assembled dowel holes 92 are drilled through the plate 12, the base 56 and the plate 16 and suitable dowel pins are inserted to maintain these elements in their preset locations.

When the valve is fitted in a typical installation a liquid feed conduit is threadably located with the the opening 70 of the input flow directing plate. Conduits which lead to different fluid circuits are threadably located within the output openings 30, 32 and 34 and a conduit which leads to a drain or sump is threadably located within the output opening 36.

The input plate member 14 is rotable about the bolt 82 to align the passageway 46 with any one of the through passages 30, 32, 34 or 36 which are formed in the output plate. As previously indicated the dimples 65 cooperate with the spring loaded ball assembly 62 to maintain the rotatable input plate member in a selected position.

It will be apparent that when the input plate member 14 is located in the position illustrated in FIGURES 1 and 2 liquid entering the valve by way of the passageway 70 will pass directly through the passageway 46 and leave the valve by way of the discharge opening 36. As previously indicated the discharge opening 36 is preferably connected to a drain or sump and consequently the liquid passing through the valve when it is set in this position may be easily recirculated.

When the input plate member 14 is rotated to align the passageway 46 with the passageway 34 (FIGURE 3) the liquid entering the valve by way of the inlet 70 can no longer pass directly to the drainage outlet 36. As previously indicated the input flow directing plate is provided with an annular channel 72 (FIGURE 1) and in view of the fact that the direct passage of the liquid from the input 70 to the drainage passage 36 is blocked, the liquid will circulate around the channel 72. Since the through passage 46 of the input plate member 14 communicates directly with the channel 72 the liquid in the channel 72 will enter the passageway 46 and then the output passage 34 and then the circuit connected to the passage 34. from the aforegoing it will be apparent that the liquid entering the valve by way of the passageway 70 may be directed to any one of the output passageways 30, 32, 34 or 36 depending upon the position of the input plate member 14. The various positions in which the input plate member 14 may be located may be identified on the exterior of the valve in order that the operator may readily determine which discharge circuit is supplied with the liquid when the handle 15 is in any set position.

Figure 4:
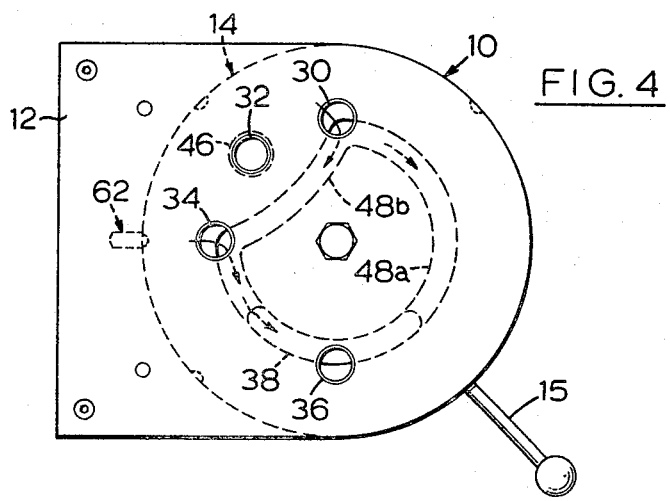
FIGURE 4 is a side view similar to FIGURES 2 and 3 showing the input plate in yet another position.

The novel drainage feature of the valve of the present invention will be apparent from FIGURES 2, 3 and 4 wherein the drainage paths are indicated by means of arrow lines. In FIGURE 3 the input plates is in a set position to discharge liquid through the discharge opening 34 and if it is then moved to a second set position to discharge liquid through discharge opening 32 (FIGURE 4) any head of water remaining in the circuit which is being supplied by the outlet 34 will automatically drain through the valve. Referring to FIGURES 2, 3 and 4 of the drawings, it will be apparent that the drainage passage 48 formed in the plate 14 will communicate with any of the discharge openings 30, 32 or 34 with which the through passageway 46 is not aligned. Consequently any liquid head in the circuit supplied by the discharge openings which are not in use will drain into the drainage passageway 48. At all positions other than the position illustrated in FIGURE 2 of the drawings the drainage passageway 48 will communicate directly with the drainage outlet 36. In the position shown in FIGURE 2 the drainage passageway 48 communicates with the drainage outlet 36 by way of the further drainage passageway 38 which is formed in the output plate 12. From the foregoing it will be apparent that the action of moving the valve from a first station to a second station automatically brings a drainage passage into communication with the first station such that any liquid remaining in the liquid circuit being supplied by the first station may be drained. It will also be noted that the configuration of the drainage passageways is such that water in any of the fluid circuits not in use will drain completely from the valve due to the force of gravity and the fact that there are no traps in the arrangement of drainage passageways which would prevent complete drainage.

Figure 5:
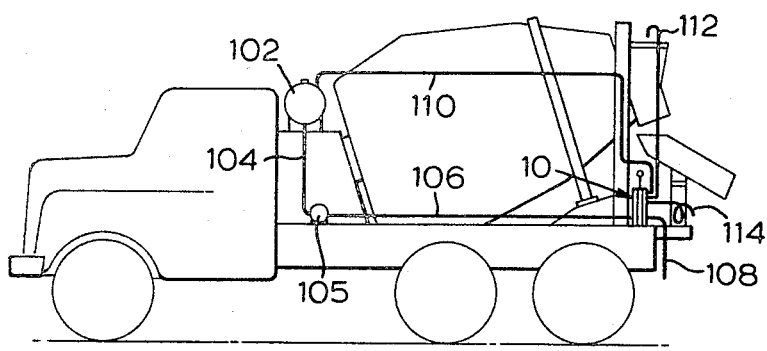
FIGURE 5 is a line diagram of the water circulating system of a transit mixer showing one application of the valve of FIGURE 1.

One application of the valve of the present invention is illustrated in FIGURE 5, wherein the valve 10 is shown operatively connected in the water circulating system of a transit concrete mixer. The water circulating system includes a storage tank 102 with an outlet pipe 104 leading to the inlet port of a circulating pump 105. The output port of the pump 105 communicates with the valve 10 by means of a conduit 106 which is connected to the passage 70. A drain pipe 108 is connected to the output passage 36, a recirculating pipe 110, hopper feed pipe 112 and washdown hose 114 are each connected to any one of the output passages 30, 32, 34.

It will be noted that the dain pipe output passage is located at a lower level than any of the other outlets whereby the water in any of the circuits may drain by gravity through the valve as described hereinbefore.

As indicated hereinabove the valve of the present invention has been found to be particularly suitable for use in the water circulating system of a transit concrete mixer, however, it will be obvious that its use is not limited to this application. In transit mixers the water circulating system generally operates at pressures of the order of 55 p.s.i. and the structure of the valve described above has proved to be capable of withstanding this pressure and the rugged treatment to which machinery is subjected in the construction industry.

Various modifications and adaptions of the present invention will be apparent to those skilled in the art without departing from the scope of the present invention. Example, it will be obvious that the input flow directing plate 16 is provided in order to have the stationary member to which a rigid input conduit may be connected, if a flexible input conduit is used it would then be possible to connect this flexible conduit directly to the input passage 46 of the input plate 14.

The input conduit might also be connected to the plate 12 and a system of internal passages employed to communicate with the input passage 46 of the input plate 14.

It will also be readily apparent that the valve may be adapted to direct fluid to any number of different outlets which might reasonably be formed in the outlet plate 12. The valve may also have a completely shut-off position by providing a station at which the input plate 14 rests wherein no discharge opening is provided in the output plate 12.

What we claim is:

1. A self-draining valve having a valve body comprising, an input member having an input through passage formed therein, an output member having a plurality of output through passages formed therein, one of said output passages being a drainage port, said members being movably mounted relative to one another to selectively align said input passage with any of said output passages as required in use, drainage passage means formed in said body and adapted to communicate between each of said output passages which are not aligned with said input passage and said drainage port to provide drainage of the non-aligned output passages.

2. A self-draining valve as claimed in claim 1, wherein said drainage passage means comprises a channel formed in said input member in the form of a major arc portion having a radius sufficient to permit said channel to open into each of said passages formed in said output member, and a minor arc portion connecting the ends of said major arc portion to form a continuous channel the curvature of said minor arc portion being such that said minor arc portion cannot communicate directly with any of said through passages of said output member, and drainage passage means formed in said output member and communicating between said drainage passage of said input member and said drainage port.

3. A self-draining valve having a valve body comprising, an input member having an input through passage formed therein, an output member having a plurality of output through passages formed therein, one of said output passages being a drainage port, said members being movably mounted relative to one another to selectively align said input passage with any of said output passages as required in use, drainage passage means formed in said input member and adapted to communicate between each of said output passages which are not aligned with said input passage and said drainage port to provide drainage of the non-aligned output passages.

4. A self-draining valve as claimed in claim 3, wherein said drainage passage means comprises a channel formed in said input member in the form of a major arc portion having a radius sufficient to permit said channel to open into each of said passages formed in said output member, and a minor arc portion connecting the ends of said major arc portion to form a continuous channel the curvature of said minor arc portion being such that said minor arc portion cannot communicate directly with any of said through passages of said output member, and drainage passage means formed in said output member and communicating between said drainage passage of said input member and said drainage port.

5. A self-draining valve having a valve body comprising, input flow directing member having a through passage formed therein, an input member having an input through passage formed therein, an output member having a plurality of output through passages formed therein, one of said output passages being a drainage port, said input member being movably mounted relative to said other members to selectively align said input passage with any of said output passages as required in use, flow directing passage means formed in said input flow directing member to communicate between said through passage of said flow directing member and said through passage of said input member in all positions of said input member, drainage passage means formed in said input member and adapted to communicate between each of said output passages which are not aligned with said input passage and said drainage port to provide automatic drainage of the non-aligned output passages.

6. A self-draining valve as claimed in claim 5, wherein said drainage passage means comprises a channel formed in said input member in the form of a major arc portion having a radius sufficient to permit said channel to open into each of said passages formed in said output member, and a minor arc portion connecting the ends of said major arc portion to form a continuous channel the curvature of said minor arc portion being such that said minor arc portion cannot communicate directly with any of said through passages of said output member, and drainage passage means formed in said output member and communicating between said drainage passage of said input member and said drainage port.

References Cited
UNITED STATES PATENTS

| | | | |
|---|---|---|---|
| 2,675,830 | 4/1954 | Vuillemin | 137—625.21 |
| 2,996,083 | 8/1961 | Huska | 137—625.11 |
| 3,338,268 | 8/1967 | Houser et al. | 137—625.46 XR |

HENRY T. KLINKSIEK, *Primary Examiner.*